United States Patent [19]

Pickles

[11] 3,935,576

[45] Jan. 27, 1976

[54] BROADBAND BEACON ANTENNA SYSTEM

[75] Inventor: Sidney Pickles, Colusa, Calif.

[73] Assignee: E-Systems, Inc., Dallas, Tex.

[22] Filed: June 3, 1974

[21] Appl. No.: 476,047

[52] U.S. Cl. .............. 343/761; 343/106 R; 343/818; 343/833

[51] Int. Cl.[2] ......................... H01Q 3/12; G01S 1/44

[58] Field of Search ......... 343/818, 819, 839, 106 R, 343/833, 761

[56] References Cited

UNITED STATES PATENTS

| | | | |
|---|---|---|---|
| 2,912,693 | 11/1959 | Lucanera et al. | 343/839 |
| 2,928,087 | 3/1960 | Parker | 343/833 |
| 3,136,996 | 6/1964 | Parker | 343/761 |
| 3,524,191 | 8/1970 | Ehrenspeck | 343/819 |

*Primary Examiner*—Eli Lieberman

*Attorney, Agent, or Firm*—Robert V. Wilder

[57] ABSTRACT

Tactical radio navigation systems provide bearing information to an interrogating aircraft in response to pairs of interrogation pulses received at a beacon transponder, the system also provides distance measuring and identification information. To provide the required bearing information, pulses radiated from the central antenna array are modulated at a 15 Hz frequency and by 135 Hz frequency, by parasitic elements rotating around a stationary central array. Broadband operation of the system is provided by a distribution pattern of the 135 Hz parasitic elements mounted radially from the central antenna array on a dielectric disc. Nine groups of radially displaced 135 Hz elements are circumferentially arranged around the dielectric disc and each element of a group is tailored to a particular frequency band in the frequency spectrum allotted to radio navigation systems.

21 Claims, 16 Drawing Figures

BROADBAND BEACON ANTENNA SYSTEM

This invention relates to an improved radio navigation antenna, and more particularly to a broadband radio navigation antenna with improved polarization purity.

Heretofore, distance measuring and bearing information systems required the use of a high power beacon transmitter to generate interrogating transmission at sufficient power to enable the interrogating aircraft to obtain a position fix. Such high power transmitters are difficult to construct and maintain to reliably provide the requisite information signals. Considering that many such systems are portable, this further increases the complexity of the source of transmitted energy. With regard to the antenna itself, generally speaking, prior antennas of the pseudoportable type provided operation only over a very narrow frequency band in the total frequency spectrum set aside for radio navigation systems. Further, the weight and power consumption of the spin motor and associated speed control was found to be excessive, especially with regard to portable systems.

Omnidirectional beacons, such as used in TACAN radio navigation systems, have provided a high order to directional accuracy. Both the frequency of operation and the angle of elevation, as measured from the antenna to an aircraft which is utilizing the beacon, have an effect on the quality of the modulation received by the aircraft. In the past, the use of antenna structures which were rather elaborate and large in size have provided satisfactory modulation performance. However, there are many applications where small size and weight requirements are imposed upon the beacon antenna. At the same time, the antenna must still provide proper and adequate modulation over a wide range of elevation angles and over a wide frequency spectrum.

A feature of the present invention is to provide a radio navigation antenna for operation over a wide frequency spectrum. Nine groups of parasitic elements are circumferentially arranged about a nonradiating disc to provide high frequency modulation to the radiation from the central antenna array. Each group of these high frequency parasitic elements comprises an array of individual elements radially displaced from the central antenna. The radial displacement and length of each element provides improved operation of the antenna over a particular frequency band of an allotted frequency spectrum.

A further feature of the present invention is to provide a radio frequency antenna system with low power requirements for rotation of modulating parasitic elements about a central antenna array. A lightweight dielectric material in the shape of a flat disc supports high frequency parasitic elements arranged in groups, with each group comprising a radial displacement of elements from a central antenna array. Low frequency parasitic elements may also be supported on the light weight dielectric disc. This disc is rotated about a central antenna array by a drive motor.

Still another feature of the present invention is to provide a radio navigation antenna system having improved polarization purity. Nine groups of parasitic elements arranged around a central antenna array comprise a configuration of individual elements. Each of the individual elements is shaped to produce cancellation of unwanted induced currents resulting in an improved polarization pure radiation pattern.

In a system wherein the present invention is embodied, radio frequency energy is fed to a stationary central antenna. This central array has no directivity in the horizontal plane. Low modulation frequency parasitic elements are rotated around the central array at a fixed number of revolutions per second. The distance between the central array and the parasitic elements is established to obtain a desired cardioid radiation pattern. For improved accuracy, a group of additional high frequency parasitic elements, mounted a fixed number of degrees apart, also rotate around the central antenna along with the low frequency elements.

In one embodiment of the present invention, a radio frequency antenna system comprises a central radiating member transmitting energy from a feed point. A first array of parasitic elements is radially displaced from the central member and rotated to provide low frequency modulation. A disc of insulating material with the upper and lower surfaces oriented generally perpendicular to the longitudinal axis of the central member, is also rotated about the central member. Mounted on this disc of insulating material is a second array of parasitic elements each having a first section disposed to extend over the disc top surface, a lower section disposed to extend over the disc bottom surface and an intermediate section joining the upper and lower sections. Thus, both the first group of parasitic elements and the second group of parasitic elements are disposed for rotation about the radiating member.

A more complete understanding of the invention and its advantages will be apparent from the specification and claims and from the accompanying drawings illustrative of the invention.

Referring to the drawings.

Referring to FIGS. 1–4, it has been shown that nine groups 58–66 of high frequency parasitic elements placed symmetrical about a central antenna 10 will produce a symmetrical nine lobed radiation pattern. This nine lobed radiation pattern is mathematically defined as follows:

$$F(\theta) = 1 + a \sum_{n=O}^{n=4} \cos[d \sin(\theta \pm 40n) + \Phi] + ja \sum_{n=0}^{n=4} \sin[d \sin(\theta \pm 40n) + \Phi] \qquad (1)$$

where, $a$ = an amplitude factor, $\theta$ = horizontal angle about the central antenna 10 and reflector system 58–66.

$\phi$ = the phase of current flowing in each parasitic element of the groups 58–66 with reference to an excitation current of the central antenna 10, and $d$ = the distance in radians from the central antenna 10 to a parasitic element of the groups 58–66.

Figure 3:
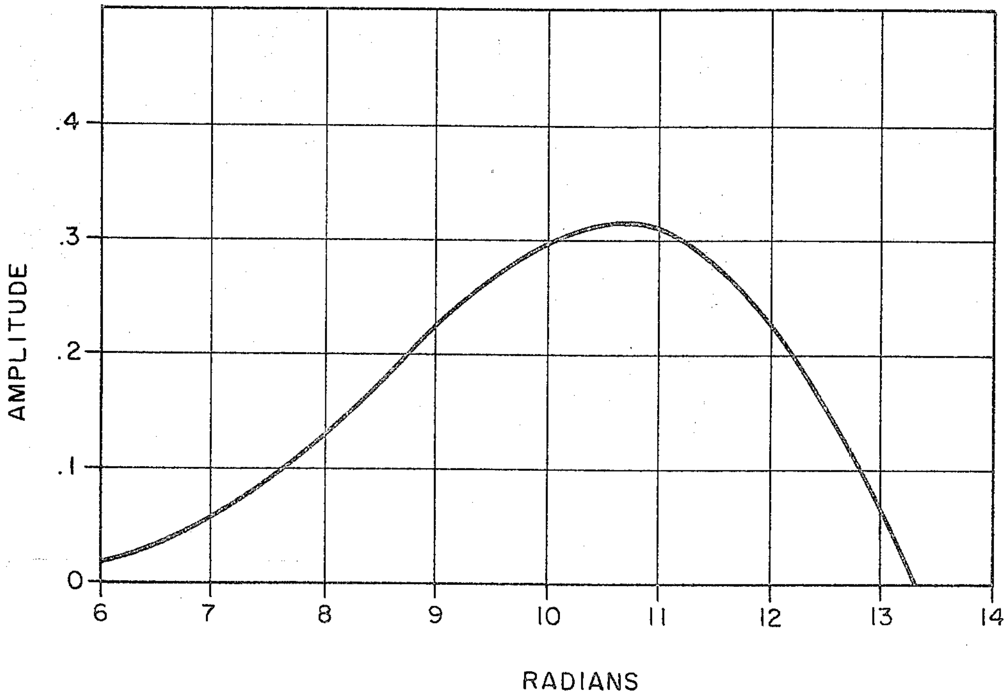
FIG. 3 is a Bessel law plot of amplitude modulation as a function of parasitic element displacement in radians from a central antenna.

The term $d$ has been shown to follow the Bessel law function as shown by the curve of FIG. 3. For a given set of radially displaced reflector elements, the depth of a lobe in the radiation pattern will be a maximum for a given dimension $d$. From the curve of FIG. 3, when the distance $d$ is approximately 11 radians optimum conditions of lobeiness are achieved. Thus, for a given frequency of excitation of the antenna 10, a parasitic element of the groups 58–66 displaced by approximately 11 radians will give an optimum lobed radiation pattern.

Another important parameter of equation (1) is the phase term $\phi$. Unless this term has a value near ± 90°, a lobed pattern will not form. When the distance between a parasitic element of the groups 58–60 and the central antenna 10 is approximately an odd number of quater wavelengths of the excitation frequency, the excitation of the parasitic element produces a current having a phase relative to the phase of the current in the central antenna 10 at 90°, 270°, 450°, etc. or the equivalent of ±90°.

The problem with radio navigation systems has been to develop an antenna that would operate over the assigned frequency range of 960 MHz to 1215 MHz while maintaining uniform radiation characteristics. If the dimension $d$ in equation (1) for parasitic elements of the groups 58–60 is set at a value of 11 radians at 960 MHz, the effective value of the dimension $d$ at 1213 MHz is:

11 × 1213 MHz/960 MHz = 13.90

With reference to FIG. 3, as the dimension $d$ changes from 11 radians to 13.90 radians the lobeiness continuously decreases to zero and then reverses to increase in an opposite phase. This effect, of course, is in addition to the phase term $\phi$ for current flowing in a parasitic element. Since at 13.90 radians the $\phi$ term is less than optimum, the lobed radiation pattern deteriorates still further.

If an optimum dimension for $d$ is established at 1213 MHz, then for 960 MHz the effective value for the dimension $d$ is 8.71 radians. The phase term $\phi$ goes out of operable limits under these conditions and the antenna ceases to function. However, if the parasitic elements are frequency responsive there will occur a rejection of excitation when an element is not in the optimum environment and will operate only when a particular frequency of excitation is applied to the central antenna 10.

Figure 1:
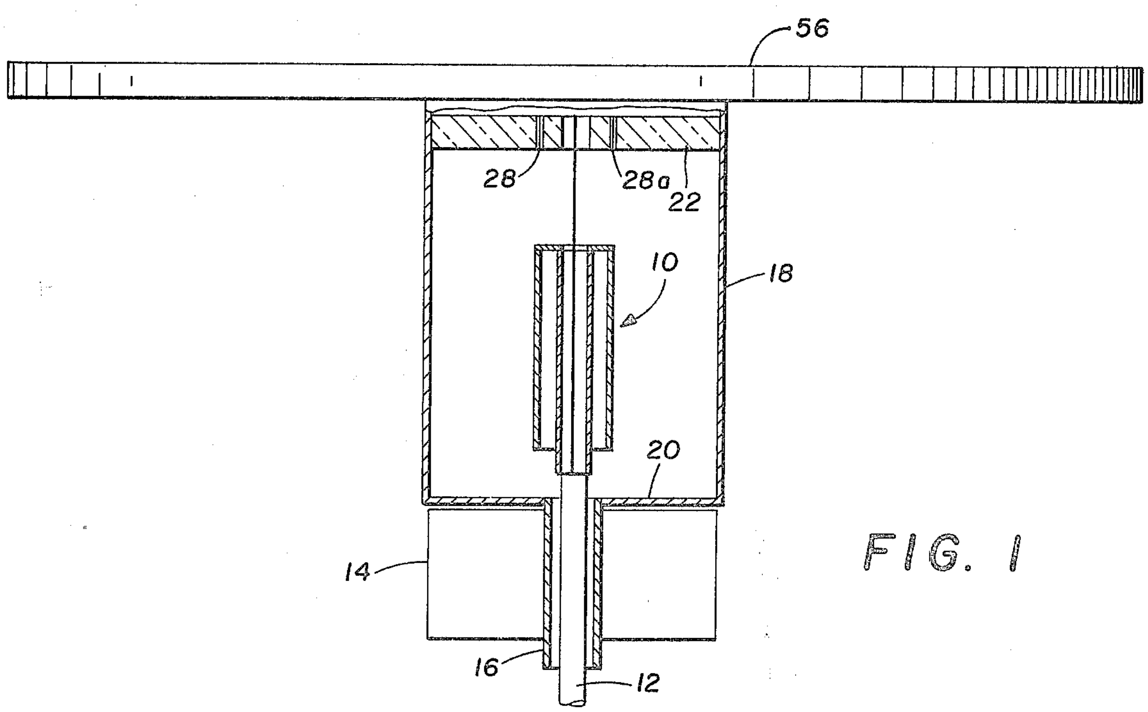
FIG. 1 is a schematic of an antenna system including a central antenna and two discs of nonconductive material mounted for rotation thereabout by means of a spin motor.

Referring now to FIG. 1, there is shown schematically an antenna of a navigation system wherein tailored high frequency responsive parasitic elements are displaced from a central antenna 10. The antenna 10 is excited by energy applied to a main transmission line 12 coupled to a source (not shown). The main transmission line 12 feeds the central antenna 10 through a hollow shaft drive motor 14 as described in the U.S. Pat. No. 3,790,943 of Sidney Pickles. The hollow shaft 16 of the motor 14 is coupled to a support tube 18 by means of a flange 20.

Figure 2:
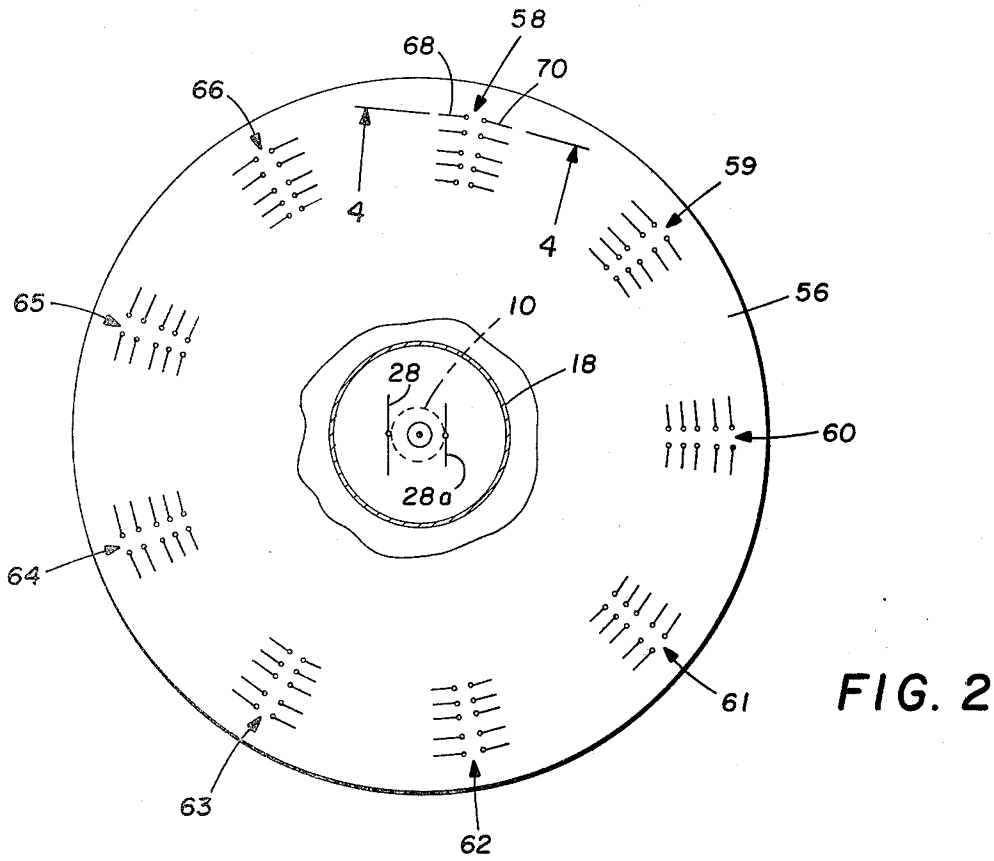
FIG. 2 is a plan view of the antenna of FIG. 1 with nine groups of high frequency parasitic elements mounted on a nonconductive disc for rotation about the central antenna.

As illustrated, at the top of the support tube 18 there is supported a disc 56 of a nonconductive material. As shown in FIG. 2, the disc 56 supports nine groups 58–66 of high frequency parasitic elements. These parasitic elements provide the high frequency modulation to energy radiated from the central antenna 10.

Mounted within the support tube 18 at a point immediately below the disc 56 are two low frequency parasitic elements 28 and 28*a* supported on a disc 22.

A typical construction of the central antenna 10 is two stacked dipole elements having a vertically polarized circular radiation pattern. As the radiated energy leaves the central antenna it illuminates the two low frequency parasitic elements 28 which provide a low frequency amplitude modulation to the radiated energy. The radiated energy continues past the low frequency parasitic elements to the high frequency parasitic elements of the groups 58–66. These elements act to further modulate the radiated energy to superimpose a high frequency component on the radiated energy.

Figure 4:
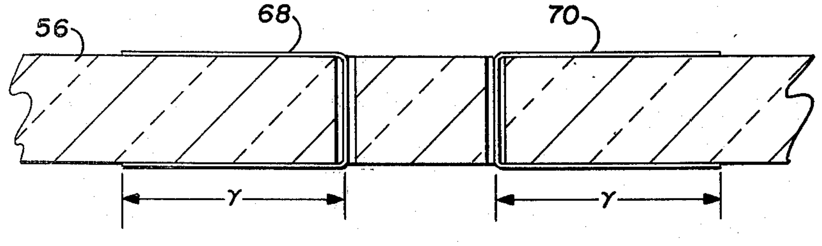
FIG. 4 is a cross-section through the disc of FIG. 2 taken along the line 4—4 showing the hairpin configuration of two parasitic elements in each of the nine groups.
Figure 5:
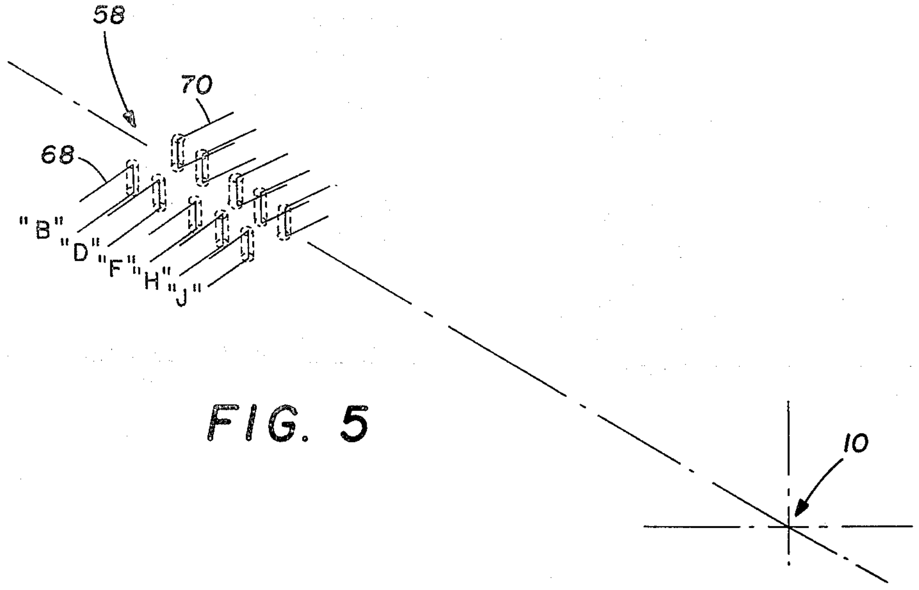
FIG. 5 is a perspective showing the radial displacement of all elements of one high frequency group from the central antenna.

Referring to FIGS. 2, 4 and 5, each group 58–66 of high frequency parasitic elements includes an array (ten shown as an example) of individual U-shaped elements. Considering the group 58, FIG. 4, shows a cross-section through the disc 56 at the elements 68 and 70. The elements 68 and 70 each include an upper transmission line section overlaying the top of the disc 56, a lower transmission line section overlaying the bottom surface of the disc and an active radiator section extending through an opening in the disc joining the upper and lower sections. Each of the elements of the groups 58–66 has a similar configuration. The elements 68 and 70 show the arrangement of adjacent elements for each of the groups.

Energy from the central antenna 10 radiates radially outward towards adjacent parasitic elements of a pair of the groups 58–66. Considering for example the pair of elements 68 and 70, there is a fixed radial dimension *d* between these elements and the central antenna 10. To provide the most efficient modulation of a signal from the antenna 10, the elements 68 and 70 are positioned from the central antenna a distance such that the phase of the traveling wave is either plus or minus 90 electrical degrees in accordance with equation (1). As will be understood, this phase angle varies with the frequency of energy from the antenna 10 and thus the elements 68 and 70, for example, will provide most efficient modulation over only a relatively narrow band of frequencies.

Typically, omnidirectional navigation antennas operate within the frequency spectrum of 960 MHz to 1215 MHz. To provide operating efficiency over this spectrum, a number (five as an example) of radially displaced U-shaped elements are included in each of the groups 58–66. The basic configuration of each of these elements is similar and each is tailored to provide the most efficient modulation over a particular frequency band in the range of from 960 MHz to 1215 MHz.

Each of the elements of the groups 58–66 can be considered as a wire in space that has a current flowing therein in accordance with the radiated energy from the antenna 10. This current produces a disturbance of the radiated energy and this disturbance is related to the resistance of the element. The resistance of each element comprises both radiation resistance and conductive resistance, the latter related to the particular wire comprising the resistance element. Preferably, each of the elements of the groups 58–66 has a radiation resistance greater than the conductive resistance to provide improved efficiency in the modulation of energy radiated from the antenna 10.

The current flowing in each element of the groups 58–66 varies in accordance with the equation:

$$i = E/(R_1 + R_2 + jx) \quad (2)$$

where, $E$ = the energy emitted from the antenna 10, $R_1$ = radiation resistance of an element, $R_2$ = the conductive resistance of an element, and $x = z_o \cot \gamma$ where, $z_o$ = the element surge impedance, and $\gamma$ = the electrical length of an element as a function of the frequency of the emitted radiation.

From equation (2), it will be understood that by proper selection of the radiation resistance and conductive resistance each of the elements of the groups 58–66 can be made responsive to a particular narrow band of frequencies in the spectrum from 960 MHz to 1215 MHz. The particular frequency to which each element is responsive may be calculated in accordance with the equation:

$$\tan \beta = \frac{jx}{R_1 + R_2} \quad (3)$$

where, $\tan \beta$ = the phase angle of current in an element due to its own impedance.

In accordance with equation (3), each of the elements can be tailored to be responsive to a particular frequency band by introduction of a reactance term which will bring its phase into the right relationship with the above equation.

Heretofore, one problem encountered in tailoring a parasitic element to be responsive to a given frequency was to control the radiation resistance of the element to provide maximum modulation efficiency. In accordance with the present invention, each of the elements of the groups 58–66 is formed into a U-shaped configuration with the result that each element is in itself an individual circuit. Current is introduced into each leg of the elements in accordance with equation (2). However, current flowing in the upper section tends to cancel out current flowing in the lower section with the result that the effective modulation current is only in the section passing through the disc 56.

However, the impedance, and thus the current in each element, varies with the frequency of excitation at the antenna 10 and for a change in frequency the reactance term begins to increase so as to decrease the current to a point where it no longer provides effective modulation. The frequency at which this occurs is established by the length of the sections overlaying the disc 56 as given by the dimension $\gamma$. For a different frequency, the length of the sections overlaying the disk 56 must change to provide efficient modulation operation. As mentioned previously it is also necessary to locate the elements radially from the central antenna 10 by a distance such that the phase angle of the radiated energy is either plus or minus 90 electrical degrees. Thus, there are two parameters that must be considered for each element of the groups 58–66. One is the length $\gamma$ of the element and the second the radial displacement *d* from the central antenna array 10.

From the above, it will be apparent that each radially displaced pair of elements in each of the groups 58–66 provides maximum modulation efficiency over a particular band of frequencies in the range of from 960 MHz to 1215 MHz. FIG. 5 shows in perspective a typical arrangement of U-shaped elements for the groups 58. Each of the other groups 59–66 is similarly arranged about the circumference of the disc 56 displaced from the central antenna 10.

Figure 6:
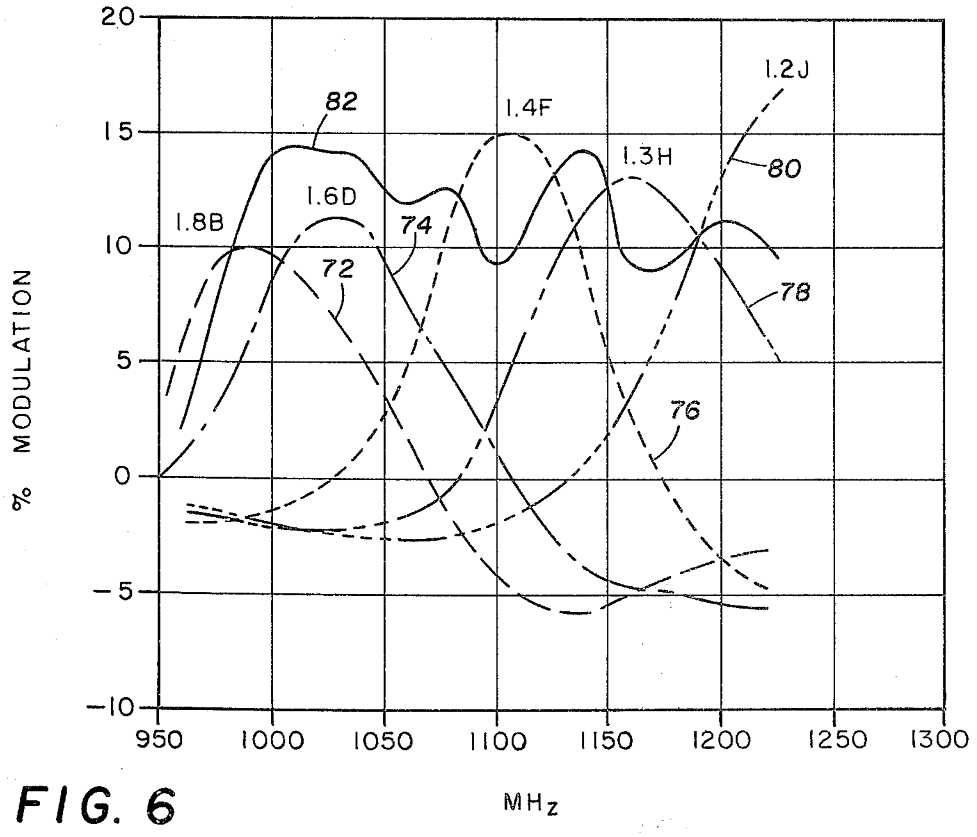
FIG. 6 is a plot of percent modulation versus frequency in megahertz for each of the individual elements in one-half of one group of the nine shown in FIG. 2.

Referring to FIG. 6, there is shown a series of curves of percent modulation versus frequency for one element of each pair of the groups 58. Starting with the curve 72, this gives the percent modulation of energy from the antenna 10 as produced by the farthermost displaced element from the disc center, element pair B of FIG. 5. In one model of an antenna in accordance with this invention, this element has a length $\gamma$ of 1.85K (K relates the electrical length to the physical length) inches with the thickness of the disc 56 equal to 1 5/16 inches. The element pair B provides peak modulation response at the lowest frequency band of the spectrum, at about 980 MHz. Considering next the element pair D, the next innermost element from the element pair B, the response is given by the curve 74 having a peak modulation efficiency of about 1030 MHz. The curve 74 is provided from data taken with the elements of pair D on a 1 5/16 inch thick disc 56 and the upper and lower sections $\gamma$ having an effective length of 1.6K inches. The element pair F provides modulation of radiated energy as given by the curve 76. This curve peaks at about 1100 MHz and the element pair F has upper and lower section lengths $\gamma$ of 1.4K inches. Element pair H produces percent modulation as given by the curve 78 with a peak at about 1160 MHz. The element pair H has upper and lower section lengths $\gamma$ of 1.3K inches. Element pair J provides percent modulation as given by the curve 80 with a peak efficiency at about 1215 MHz. The innermost element pair J has a section length $\gamma$ of 1.2K inches.

One of the pairs of elements of each of the groups 58–66 provides similar percent modulation versus frequency data. The corresponding radially displaced elements of each group has the same length $\gamma$ as the corresponding element in other groups and is displaced radially the same distance from the antenna 10.

The composite effect of one element of each pair in a group provides a percent modulation versus frequency as given by the curve 82. This curve represents the summation of each of the five curves 72, 74, 76, 78 and 80. Modulation of radiant energy from the antenna 10 is thus seen to be effective over the frequency spectrum from 960 MHz to 1215 MHz.

Figure 7:
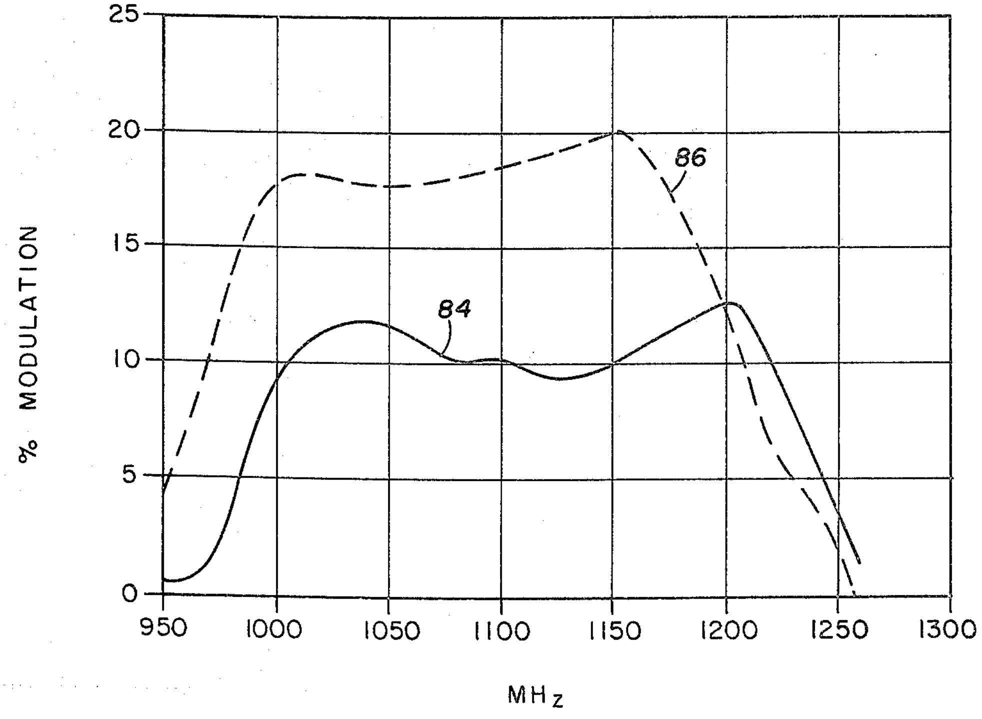
FIG. 7 is a plot of percent modulation versus frequency in megahertz showing the composite of all elements of one group over a frequency from 950 megahertz to 1250 megahertz.

Referring to FIG. 7, by tailoring the section lengths of the various elements of the groups 58–60, the peaks and valleys of the curve 82 can be smoothed out to provide a response as shown by the curve 84. For example, the element of pair F of each group is tailored to provide greater response at the 1100 MHz transmission frequency. Similarly, the elements of pair H of each group are also tailored to provide greater percent modulation. However, since there is interaction between all elements of the group, the effect of adjusting the length of one element of a group must be considered on the other elements. A reasonably flat response over the range of frequencies of interest is obtainable as shown by the curve 84.

The above discussion with regard to FIGS. 6 and 7 considers only one-half of each element pair of the groups 58–66. The opposing element of each pair of elements B, D, F, H and J, also affects the percent modulation of radiated energy. This provides improved efficiency as given by the curve 86 of FIG. 7. Again, the curve is flattened by tailoring the length of the elements of each of the various groups. Note, that the curve 86 is not double the curve 84 because of coupling between the two opposing sets of elements of a group.

Another advantage of the parasitic element groups of the present invention is the improvement of polarization purity of radiated energy. If a system is radiating reasonably pure polarization, an interrogating station responds only to polarization along one axis and more accurate determination of position is possible.

Considering that the electric stress for each section of an element is along straight lines, then the polarization of the upper section on the disc 56 tends to cancel the polarization from the lower section of an element. This effect tends to cancel horizontal polarization leaving only the desired vertical polarization for an interrogating station. By using opposed U-shaped elements, as shown in each of the groups 55–58, further improvement of polarization is achieved. Current in the opposed groups producing radiation along an axis other than in the vertical tends to cancel leaving only vertical polarization emitting from the system.

With many presently available radio navigation antennas it has been difficult to obtain a radiation pattern in the vertical direction which has similar components of radiation. That is, the carrier radiation provided a different system when compared to the parasitic elements, and the low frequency parasitic elements as well as the high frequency elements also each provided a different radiation component resulting in distinct radiation patterns for each component. This produced the undesirable result of a modulation percentage change in excess of a tolerable limit in the vertical plane.

Previous attempts to correct this problem had the parasitic elements assembled between metal sheets, with the common practice to make these sheets somewhat conical in shape. This results in a wide band conical horn, however, in the case of a TACAN system such a shape produced complex polarization of the side band radiation.

Figure 8:
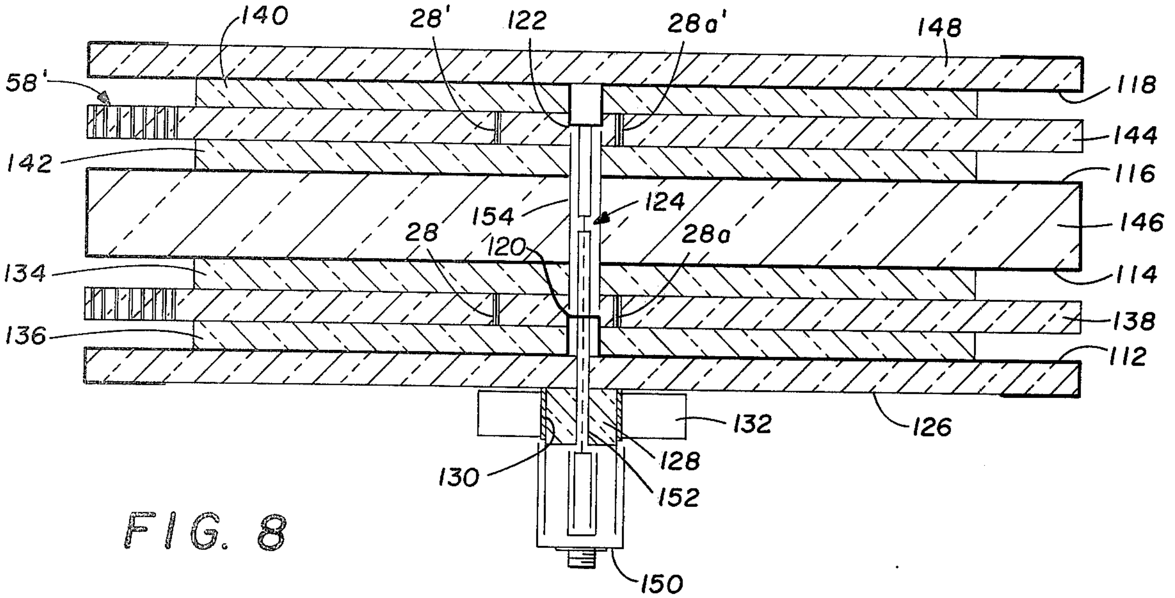
FIG. 8 is a schematic of an alternate embodiment of the antenna system of the present invention where a single transmission line is split into two lines to feed two sets of parallel parasitic elements in an in-phase condition.
Figure 9:
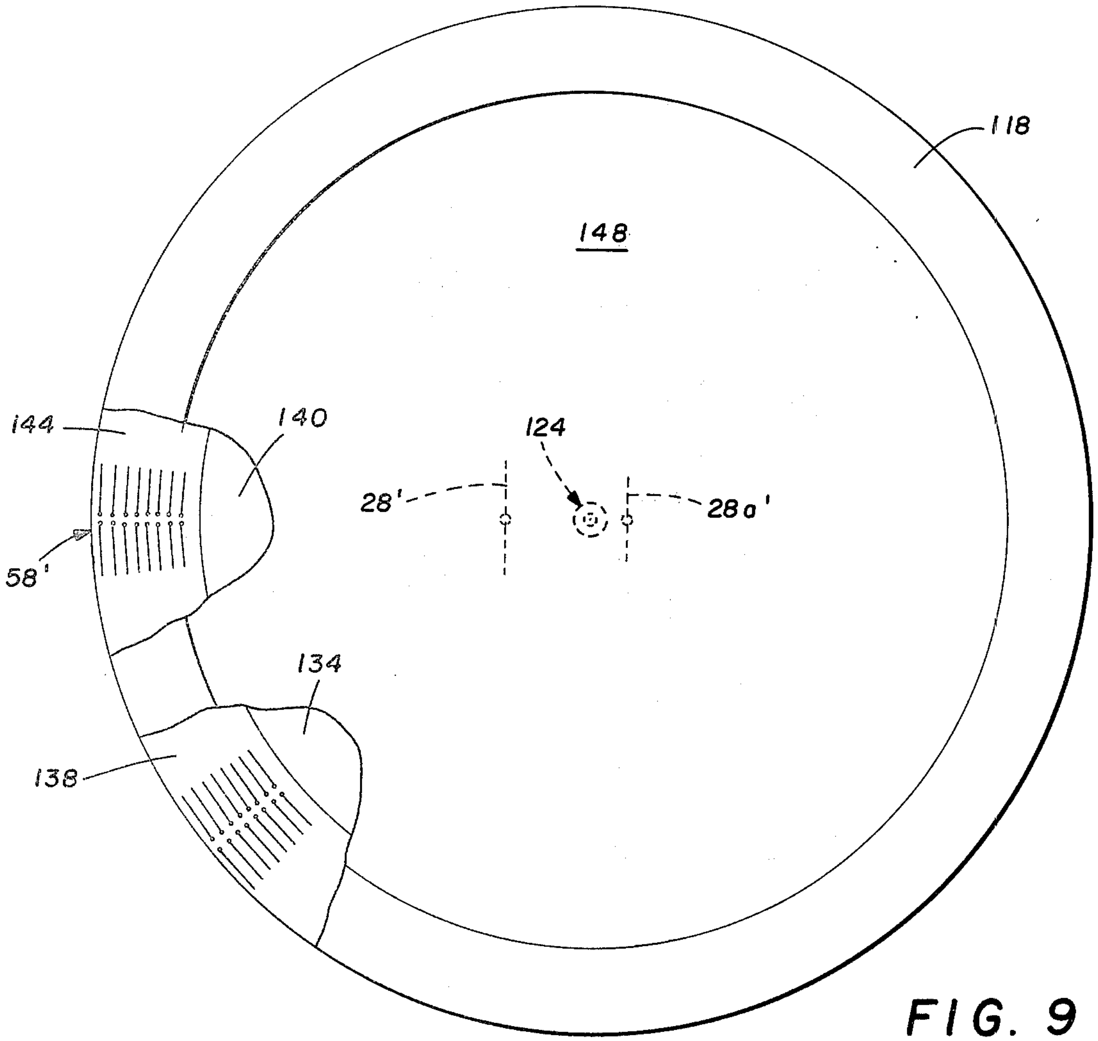
FIG. 9 is a plan view of the antenna of FIG. 8, partially cut away to show one group of high frequency parasitic elements mounted on a nonconductive disc for rotation about a central antenna.

Referring to FIGS. 8 and 9, there is shown an embodiment of an antenna of the present invention wherein flat plates 112, 114 and 116, 118 of a conductive material cause radiation initiating from radiating points 120 and 122 of a central antenna 124 to flow outward radially.

The flat plate 112 is formed over a circular core disc 126 of a nonconductive supporting material. This disc includes a hub 128 assembled through a rotor tube 130 of a hollow shaft motor 132. Excitation of the motor 132 causes the disc 126 to rotate with the central antenna 124.

Sandwiched between the flat plates 112 and 114 are spacer discs 134 and 136 on either side of an element disc 138. Each of the discs 134, 136 and 138 is made of a nonconductive material. Supported toward the center of the element disc 138 are low frequency parasitic elements 28 and 28*a* shown in FIGS. 1 and 2. Around the circumference of the element disc 138 there are equally spaced the groups 58–66 of high frequency parasitic elements as shown in FIGS. 1 and 2. Typically, there are nine groups of the high frequency parasitic elements spaced around the disc 138 at 40° intervals. Operationally, the low frequency parasitic elements 28 and 28a and the groups 58–66 of high frequency parasitic elements are illuminated from the radiating point 120 of the central antenna 124.

Sandwiched between the flat plates 116 and 118 are spacer discs 140 and 142 on either side of an element disc 144. The element disc 144 is similar to the element disc 138 and includes low frequency parasitic elements 28′ and 28*a*′ close into the antenna 124. Spaced about the element disc 144 toward the outer edge thereof are groups 58′–66′ of high frequency parasitic elements, as previously described. The low frequency parasitic elements 28′ and 28*a*′ and the groups 58′–66′ are illuminated from the radiating point 122 of the central antenna 124.

The flat plates 114 and 116 are formed from a continuous sheet covering a core disc 146 of a nonconductive material. Similarly, the flat plate 118 is molded over a core disc 148 also of a nonconductive supporting material. The entire structure is rotated by the motor 132 through the core disc 126.

Radio frequency energy is introduced to the central antenna 124 through a rotatable connector 150 by means of a coaxial transmission line 152. The transmission line 152, in accordance with a usual design configuration, includes an inner conductor and an outer conductor insulated from each other by the construction of the transmission line. The inner conductor is connected directly to the central antenna 124. Energy emitting from the transmission point of the antenna 124 is introduced into a secondary transmission line 154 for transmission to the radiating points 120 and 122.

The conductive plates 112 and 114 form the inner surfaces of a radiating horn structure. This horn structure directs a relatively well defined beam radially outward in a direction parallel to the plates 112 and 114 in a horizontal direction away from the radiating point 120. Similarly, the conductive plates 116 and 118 form a horn structure that directs a relatively well defined beam outward in a direction parallel to the two plates from the radiating point 122.

As taught in U.S. Pat. No. 3,000,008, when two such horn structures or slots are set into operation with a half wavelength spacing between the radiation points 120 and 122, radiated energy along a perpendicular to the conductive plates tends to cancel between the two systems while reinforcing the energy from the opposed structure radiating outwardly from the radiation point. That is, with the limitation that the radiating points 120 and 122 are energized in phase. This in-phase excitation is accomplished by properly designing the central antenna 124.

An antenna system as shown in FIGS. 8 and 9, wherein pairs of horn structures are stacked, a greater vertical directivity is achieved. Utilizing the U-shaped high frequency paratsitic elements for the groups 58–66 and 58'–66', each horn of the embodiment of FIGS. 8 and 9 enables operation of the antenna over the spectrum of 960 MHz to 1215 MHz.

Figure 10:
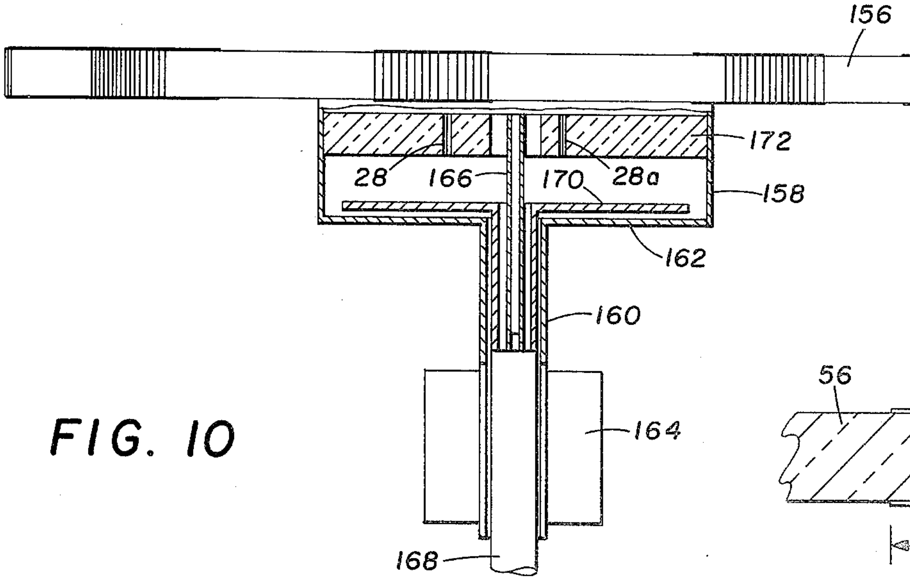
FIG. 10 is a schematic of another embodiment of the present invention wherein nine groups of high frequency parasitic elements are radially oriented on a nonconductive disc for rotation about a central antenna to obtain minimum size in high or low band.
Figure 11:
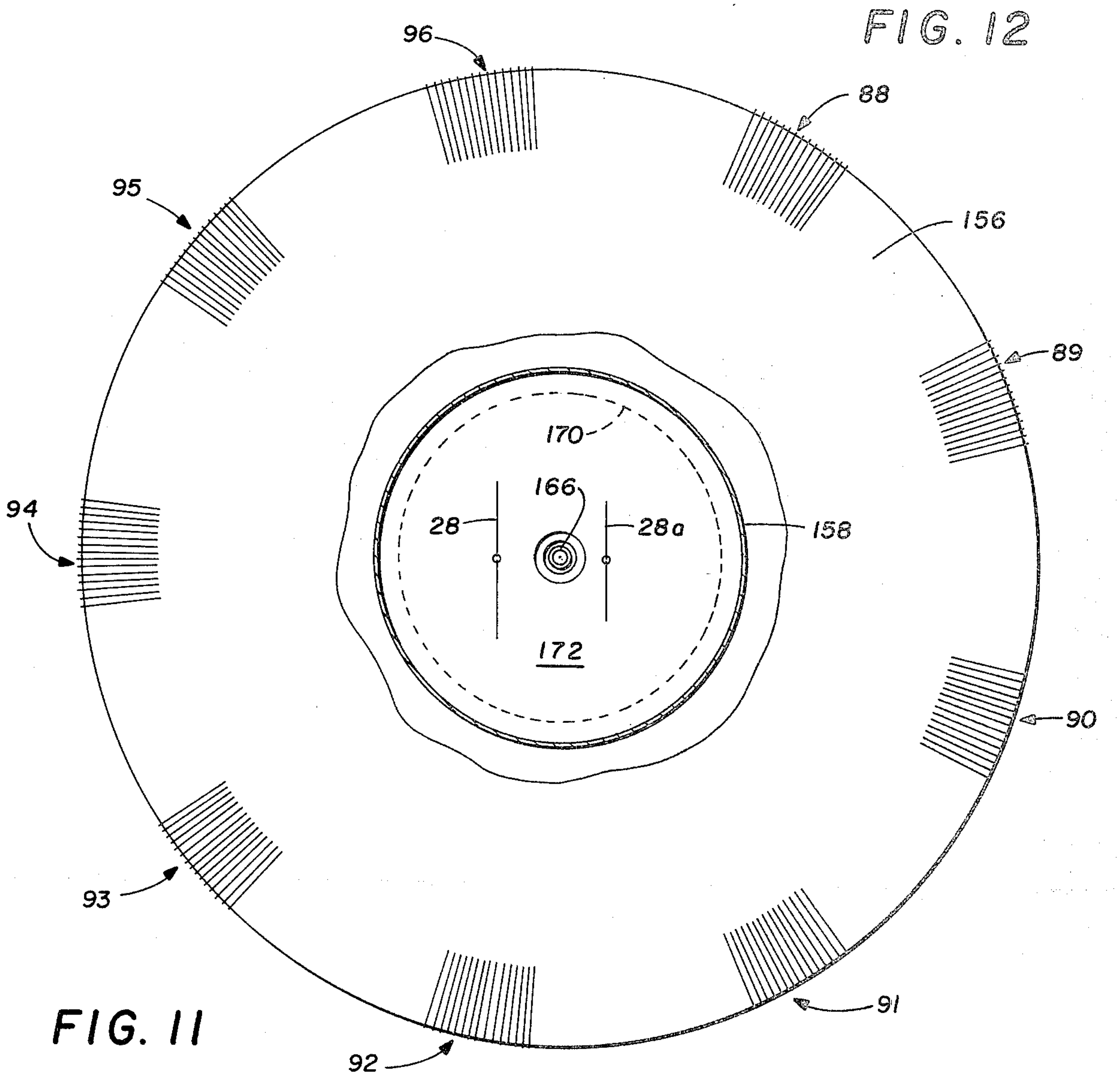
FIG. 11 is a plan view of the alternate embodiment of the disc of FIG. 1 showing nine groups of high frequency parasitic elements radially oriented on the disc.

Referring to FIGS. 10 and 11, there is shown a modification of the arrangement of the high frequency parasitic elements. The elements are arranged in groups circumferentially displaced around a disc 156. The disc 156 is attached to a support tube 158 which is, in turn fastened to a rotor tube 160 by means of a flange 162. The rotor tube 160 is part of a hollow shaft motor 164, as explained previously.

A central antenna 166 extends through the rotating tube 160 and is fixed in position relative to the tube 160. A coaxial line 168 introduces RF energy to the antenna radiating structure through the rotating tube 120.

Also fixed in space relative to the rotating tube 160 is a counterpoise plate 170 positioned below the radiating point of the central antenna 166. Thus, the plate 170 acts as a reflecting ground plane or counterpoise for the antenna 166. Radiation from the antenna 166 will strike the plate 170 and will be reflected in an upward direction. This produces a relative stregthening of the radiation pattern of the antenna 166 by giving an upward tilt to the pattern. This reflection of energy further illuminates the high frequency parasitic elements of the disc 156.

Positioned within the rotating tube 158 is a support disc 172 having a center aperture for receiving the central antenna 166. Mounted to the disc 172 are low frequency parasitic elements 28 and 28*a*.

Figure 12:
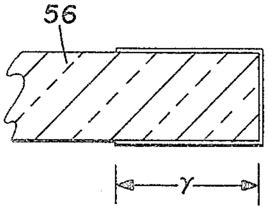
FIG. 12 is a cross-section through one of the groups of elements of FIG. 11 showing the hairpin configuration of each element and its position on the rotating disc.

Equally spaced about the circumference of the disc 156 are groups of parasitic elements 88–96 with each element of the various groups having a configuration as shown in FIG. 12. Each element of the groups 88–96 has an upper section overlaying the upper surface of the disc 156, a lower section overlaying the bottom surface of the disc and an intermediate section joining the upper and lower portions. The upper and lower sections of each of the U-shaped elements are oriented on a radial from the central antenna 166. The intermediate section extends over the outer surface of the disc 156 and is parallel to the longitudinal axis of the central antenna 166.

Each element of the groups 88–96 is designed in accordance with the previous description with reference to the elements of FIG. 2. The phase angle of the radiating wave is either plus or minus 90 electrical degrees at the intermediate section. Again, the length of the upper and lower sections $\gamma$ is determined by the frequency of the emitted wave having the proper phase displacement. Thus, the embodiment of FIGS. 10 and 11 has a relatively narrow operational band in the frequency spectrum of 960 MHz to 1215 MHz. However, the radial orientation results in a minimum diameter to produce a minimum size for portability. The multiplicity of elements produces the required modulation.

Although operational over only a narrow frequency band, the embodiment of FIGS. 10 and 11 does provide improved polarization purity by the cancellation of currents as explained.

It will be apparent to those skilled in the art that as a further modification of the antenna of FIGS. 10 and 11, each of the elements of the groups 88–96 may be radially displaced. Thus, the element B of group 88 is located at the circumference of the disc 156 and each of the remaining elements have the vertical intermediate section radially displaced inwardly therefrom toward the antenna 166.

It is also considered to be within the scope of the invention to vary the orientation of the elements between a displacement on a radius, as shown in FIGS. 10 and 11, and displacement along the circumference as shown in FIG. 2. That is, each element of the various groups may be arranged at other than on the circumference or on a radius.

Considering a further modification, each of the elements of the groups shown in FIGS. 2 and 11 intercouples with elements of the same group. That is, for some limited bandwidth applications a single element equal in width to the combined width of the elements shown may be utilized. Again the previous explanation covering the design of a U-shaped element applies to determine the final dimensional configuration of such an element.

Figure 13:
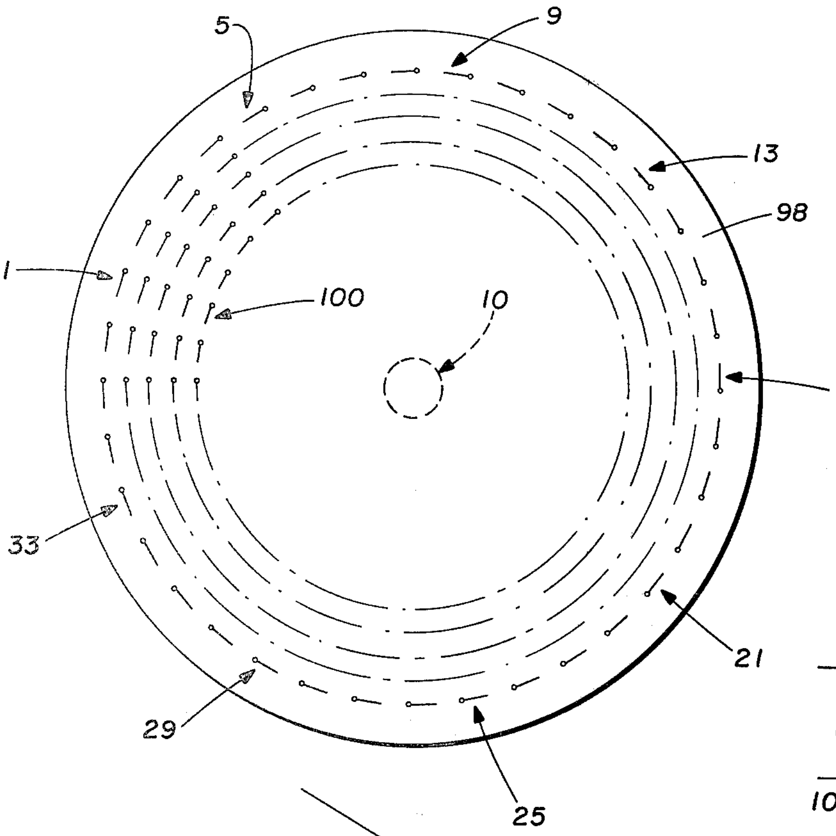
FIG. 13 is a plan view of a modification of the present invention for providing an electronically scanned antenna system.

Referring to FIG. 13, there is shown a modification of the invention wherein the U-shaped parasitic elements are mounted on a disc 98 fixed in space with relation to the central antenna 10. Thirty-six groups 100 of high frequency parasitic elements are equally spaced about the disc 98, with the outermost element of each at the circumference of the disc. Each of the groups 100 includes individual elements (five for example), with each element of a group radially displaced from the antenna 10 by an amount to be responsive to a particular frequency band over the spectrum of 960 MHz to 1215 MHz.

Figure 14:
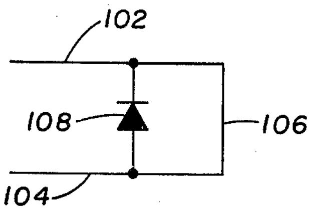
FIG. 14 is a schematic of one of the one hundred eighty elements of FIG. 13 showing a diode interconnection.

Referring to FIG. 14, each of the 180 parasitic elements arranged about the disc 98 comprises an upper transmission line section 102, a lower transmission line section 104 and an active radiator 106. Interconnected between the transmission lines 102 and 104 is a diode 108.

Figure 15:
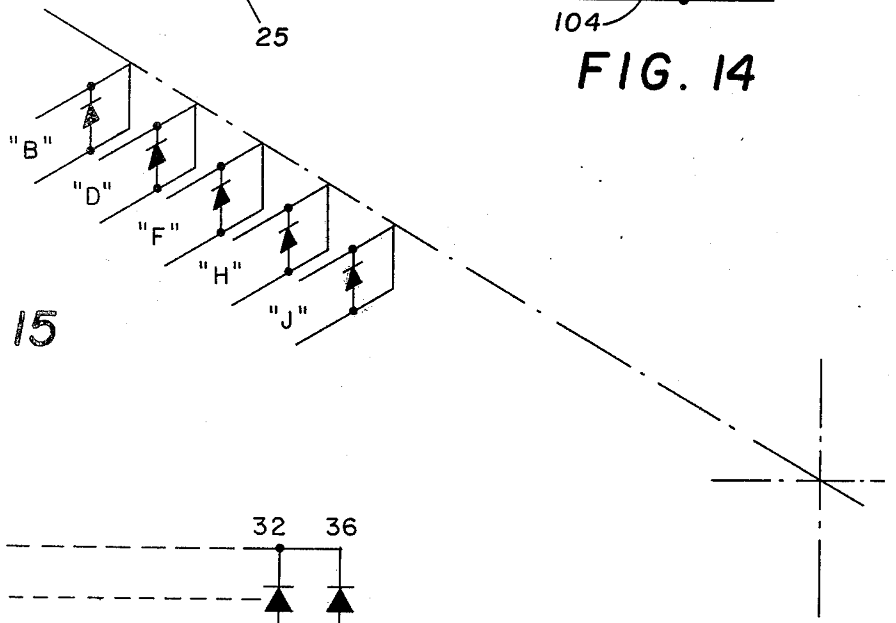
FIG. 15 is a perspecive view of the radial arrangement of one group of parasitic elements displaced on the disc of FIG. 13.

The in-space arrangement of the five parasitic elements of a group is shown in FIG. 15, with the lowest frequency element identified by the letter B and the elements D, F, H and J each responsive to a higher frequency transmitted by the antenna 10.

In the embodiment of FIGS. 1 and 2, the antenna 10 is fixed in space and the disc 56 rotates by means of a spin motor to modulate energy radiating from the central antenna. The rotating parasitic elements of the groups 58–66 provide modulation for directional navigation. With the embodiment of FIG. 13, both the central antenna 10 and the disc 98, with the one hundred eighty parasitic elements fixed thereto, all remain stationary in space. Radiation from the central antenna 10 is modulated to provide navigational information by electronically scanning all the elements of each of the groups 100 radially displaced from the central antenna on the same diameter. The desired azimuth radiation pattern shape is rotated without the mechanical motion of any of the antenna components by rotating the excitation of the diode 108 for each of the parasitic elements.

Figure 16:
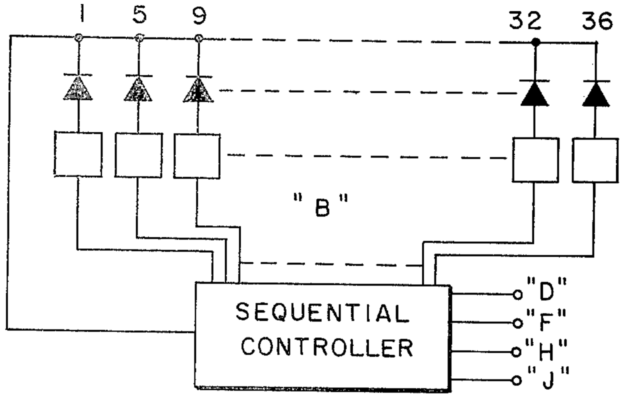
FIG. 16 is a block diagram of a system for sequentially scanning the diodes of the elements in groups of nine.

Referring to FIG. 16, there is shown a block diagram of a system for electronically exciting the parasitic elements of the groups 100 to tune and detune the U-shaped elements to thereby provide modulation to radiation from the antenna 10. A sequential controller 110, of conventional logic, sequentially energizes in groups of nine the diodes 108 located on one diameter, for example, diodes on the diameter B. Considering that the antenna 10 is radiating at its lowest frequency, and the sequential controller 110 energizes the diodes of the element B, then during the first sequence, the diodes located at groups 1, 5, 9, 13, 17, 21, 25, 29 and 33 are simultaneously energized to provide reradiation of energy from the antenna 10. The sequential controller 110 then steps one position so that the diode connected to the element B of the next higher numbered group is energized. The controller 110 continues to sequence energizing the diodes 108 in groups of nine for the element B as shown by the Table I.

TABLE I

| Sequence | Groups Energized | | | | | | | | |
|---|---|---|---|---|---|---|---|---|---|
| 1 | 1 | 5 | 9 | 13 | 17 | 21 | 25 | 29 | 33 |
| 2 | 2 | 6 | 10 | 14 | 18 | 22 | 26 | 30 | 34 |
| 3 | 3 | 7 | 11 | 15 | 19 | 23 | 27 | 31 | 35 |
| 4 | 4 | 8 | 12 | 16 | 20 | 24 | 28 | 32 | 36 |

After stepping four times, the controller returns to the original sequence of 1, 5, 9 etc. This sequential energizing of the diodes 108 on a particular diameter in groups of nine provides high frequency modulation of energy from the antenna 10. The pattern of radiated energy is substantially as provided by rotating the disc 56 of FIG. 2 about the central antenna 10, as described previously.

The same sequential energization of the diodes 108 takes place when the antenna 10 is radiating at a higher frequency. Each of the diodes 108 of the element D is connected to the sequential controller 110 at the terminal D. These are sequentially energized in groups of nine in the order as given in Table I. The diodes of elements F, H and J are also energized in groups of nine for progressively high frequency bands of energy radiated from the central antenna 10.

Again, it should be emphasized that the particular orientation of the parasitic elements on the disc 98 may be varied. Further, for narrow band operation of the modification of FIG. 13, fewer than five elements may be included in each of the groups 100. It will be understood that for operation of the lowest frequency band, for example, for 960 MHz to 1025 MHz only the elements D of each group are required and for operating at the highest frequency band, for example from 1150 MHz to 1215 MHz only the innermost elements J of each group are required. This provides omnidirectional beacon antenna operation over two frequency bands separated by a frequency spectrum.

While several embodiments of the invention, together with modifications thereof, have been described in detail herein and shown in the accompanying drawings, it will be evident that various further modifications are possible without departing from the scope of the invention.

What is claimed is:

1. An antenna system, comprising in combination:
- a central radiating member arranged to transmit energy from a feed point;
- a first plurality of parasitic elements radially displaced from said central member;
- a support of nonradiating material having a top and bottom surface oriented generally perpendicularly to the longitudinal axis of said central member;
- a second plurality of parasitic elements each element having a first section disposed to extend over the support top surface, a second section disposed to extend over the support bottom surface and an intermediate section joining the first and second sections to form therewith a long line section, said intermediate section being the only section of each element of said second plurality providing significant radiation; and
- said first plurality of parasitic elements and said support disposed for rotation about said radiating member.

2. An antenna system as set forth in claim 1 wherein said support substantially comprises a disc and said second plurality of parasitic elements comprises nine groups equally spaced circumferentially around said disc.

3. An antenna system comprising:
- a central radiating member arranged to transmit energy from a feed point;
- a first plurality of parasitic elements radially displaced from said central member;
- a support of nonradiating material having a top and bottom surface oriented generally perpendicularly to the longitudinal axis of said central member;
- a second plurality of parasitic elements, each element have a first section disposed to extend over the support top surface, a second section disposed to extend over the support bottom surface, and an intermediate section joining the first and second sections, said second plurality of parasitic elements including nine groups of elements equally spaced from each other and surrounding said central radiating member, each of said groups further including at least one pair of adjacent parasitic elements with the first and second sections of each element of each pair extending away from the intermediate section of the opposite element, said first plurality of parasitic elements and said support being disposed for rotation about said central radiating member.

4. An antenna system as set forth in claim 3 wherein corresponding elements of pairs of the groups are located radially the same distance from the center of said central radiating member.

5. An antenna system as set forth in claim 3 wherein each group includes elements in pairs radially displaced from juxtapositioned pairs of elements and located radially from the central member the same distance as a corresponding element in adjacent groups.

6. An antenna system as set forth in claim 5 wherein the length of the first and second section of each element of a pair increases with radial displacement from the center of the central radiating member.

7. An antenna system as set forth in claim 1 wherein the first, second and intermediate sections of each element lie in a common plane substantially perpendicular to the plane of said support.

8. An antenna system, comprising in combination:

a central radiating member arranged to transmit energy from a feed point;

a first plurality of parasitic elements radially displaced from said central member;

a support of nonradiating material having a top and bottom surface oriented generally perpendicularly to the longitudinal axis of said central member;

a second plurality of parasitic elements each having a first section located on a radial from said central radiating member and extending over the top of said support, a second section located on a radial from said central radiating member and extending over the bottom of said support, and an intermediate section joining the first and second sections to form therewith a long line section, said intermediate section being the only section of each element of said second plurality providing significant radiation; and said first plurality of parasitic elements and said support disposed for rotation about said radiating member.

9. An antenna system comprising:

a central radiating member arranged to transmit energy from a feed point;

a first plurality of parasitic elements radially displaced from said central member;

a support of nonradiating material having a top and bottom surface oriented generally perpendicularly to the longitudinal axis of said central member; and a second plurality of parasitic elements each having a first section extending over the top of said support, a second section extending over the bottom of said support and an intermediate section joining the first and second sections to form therewith a long line section, said intermediate section being the only section of each element of said second plurality providing significant radiation, said first, second and intermediate sections of any one element of said second plurality being located within a corresponding radial plane from said central radiating member, said first plurality of parasitic elements and said support being disposed for rotation about said central radiating member.

10. An antenna system as set forth in claim 8 wherein each second plurality of parasitic elements comprises nine groups equally spaced circumferentially around said disc.

11. An antenna system as set forth in claim 10 wherein each group includes multiple elements circumferentially displaced from adjacent elements.

12. An antenna system as set forth in claim 11 wherein the parasitic elements of the second plurality are located at the disc circumference.

13. An antenna system comprising:

a central radiating member arranged to transmit energy from a feed point;

a support of nonradiating material having top and bottom surfaces oriented generally perpendicularly to the longitudinal axis of said central member;

a plurality of parasitic elements, each element having a first section disposed to extend over the support top surface, a second section disposed to extend over the support bottom surface, and an intermediate section joining said first and second sections to form therewith a long line section, said intermediate section being the only section of each element of said plurality providing significant radiation; and said support being disposed for rotation about said central radiating member.

14. An antenna system comprising:

a central radiating member arranged to transmit energy from a feed point;

a support of nonradiating material having top and bottom surfaces oriented generally perpendicularly to the longitudinal axis of said central member;

a plurality of parasitic elements, each element having a first section disposed to extend over the support top surface, the second section disposed to extend over the support bottom surface and an intermediate section joining the first and second sections, said plurality of parasitic elements including nine groups of elements equally spaced from each other and surrounding said central radiating member, each of said groups further including at least one pair of adjacent parasitic elements with the first and second sections of each element of each pair extending away from the intermediate section of the opposite element of the pair, said support being disposed for rotation about said central radiating member.

15. An antenna system as set forth in claim 14 wherein the length of the first and second sections of each element of said plurality varies with the distance of that element from said central radiating member.

16. An antenna system comprising:

a central radiating member arranged to transmit energy from a feed point;

a support of nonradiating material having top and bottom surfaces oriented generally perpendicularly to the longitudinal axis of said central member;

a plurality of parasitic elements each having a first section located on a radial from said central radiating member and extending over the top of said support, a second section located on a radial from said central radiating member and extending over the bottom of said support, and an intermediate section joining the first and second sections to form a long line section, said intermediate section being the only section of each element of said plurality providing significant radiation, said support being disposed for rotation about said central radiating member.

17. An antenna system as set forth in claim 16 wherein the first, second and intermediate sections of each element are located within a corresponding radial plane from said central radiating member.

18. An antenna system as set forth in claim 17 wherein each element lies within a different plane from said central radiating member.

19. An antenna system comprising:

a central radiating member arranged to transmit energy from a feed point;

a support of nonradiating material having top and bottom surfaces oriented generally perpendicularly to the longitudinal axis of said central member;

a plurality of parasitic elements each element having a first section disposed to extend over the support top surface, a second section disposed to extend over the support bottom surface, and an intermediate section joining the first and second sections to form therewith a long line section, said first and second sections of each element extending perpendicularly with respect to a radial plane from said central radiating member within which the intermediate section of that element lies, said intermediate section being the only section of each element providing significant radiation.

20. An antenna system as set forth in claim 19 wherein each element further includes a diode means connecting the first and second sections thereof.

21. An antenna system as set forth in claim 20 and further including means for sequentially energizing said diode means.

* * * * *